April 12, 1932.  C. H. LOUTREL  1,853,440

LOCK WASHER

Filed Jan. 28, 1931

Inventor
Cyrus H. Loutrel
By
Attorney

Patented Apr. 12, 1932

1,853,440

UNITED STATES PATENT OFFICE

CYRUS H. LOUTREL, OF SOUTH ORANGE, NEW JERSEY, ASSIGNOR TO THE NATIONAL LOCK WASHER COMPANY, OF NEWARK, NEW JERSEY, A CORPORATION OF NEW JERSEY

LOCK WASHER

Application filed January 28, 1931. Serial No. 511,896.

My invention relates to lock washers, but more particularly has reference to spring washers that are segments of a helix and are used in connection with bolts and nuts for the purpose of resiliently securing the splice-bars to the meeting ends of railroad rails.

The use of spring washers around the bolts and interposed between such bars and the securing nuts is so well understood as to require no description or special comment herein, but difficulty is experienced in greasing or oiling the bolts and nuts so that they will not become corroded.

It is a common practice to essay this oiling or greasing of the bolts and nuts, and, in fact, the entire rail joint, by means of an oiling machine running on the rails themselves, but when such a machine is not available, men walk along the track carrying pails of oil and brushes or brooms which are dipped in the oil and splashed against the joint, the nuts and bolts. In either of these processes it is unlikely that the oil would percolate between the washer and the bolt or between the washer and the splice-bar and run into the threads of the bolt. Therefore there is very apt to be an area of bolt threads that is not lubricated and is subject to corrosion.

It is the object of this invention to so equip the lock washer that, as the latter expands or contracts, due to heavy loads passing over the joint or to changes of temperature, the threads of the bolt will be lubricated.

This result is brought about by the formation of grooves or pockets within the inner edge of the washer, which, of course, is the edge that is adjacent the bolt, and filling these grooves or pockets with heavy oil or grease, or other suitable lubricant, so that the expansion or contraction of the washer above referred to, will cause the lubricant to flow sufficiently so as to be transferred to the threads of the bolt.

Figure 1:
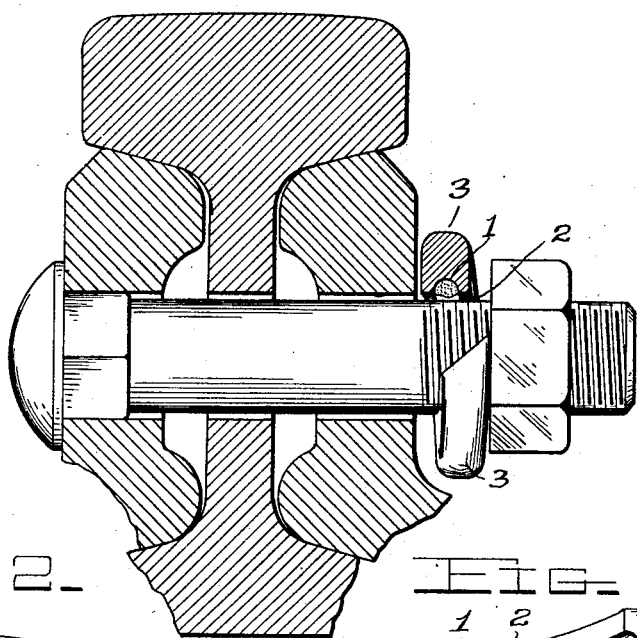
Figure 2:
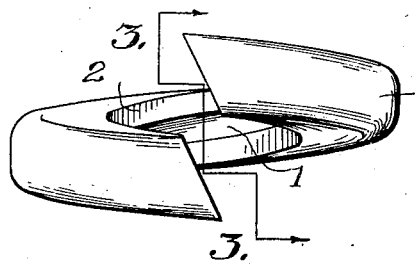
Figure 3:
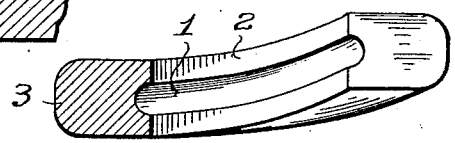
Figure 4:
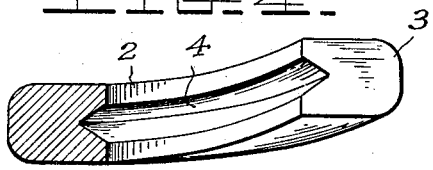
Figure 5:

In the accompanying drawings, which must be taken into consideration as a part of this description, Figure 1 is a broken sectional elevation showing the assembly of the splice-bars, rail web, bolt, lock washer and nut, the inner edge of the washer showing one form of my invention, Figure 2 is an elevation of a spring washer having a groove formed throughout the inner edge, such as is shown at Figure 1, Figure 3 is a section at the line 3—3 of Figure 2, Figures 4 and 5 are views similar to Figure 3, but showing modified forms of the lubricant containing grooves.

Figure 6:
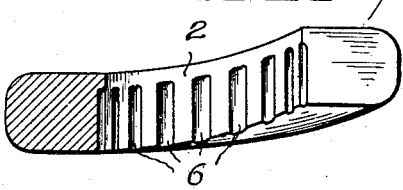
Figure 7:
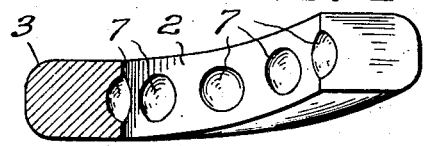

Figure 6 is a broken elevation showing the inner edge of a lock washer with vertically disposed lubricant containing grooves, and Figure 7 is a view similar to Figure 6, but showing separate lubricant containing recesses or depressions that are not in the form of a groove.

Similar numerals of reference will be used to denote like parts in the several figures of the drawings.

In the construction shown at Figures 1, 2 and 3, the lubricant container is a circular groove 1 formed in the inner edge 2 of the lock washer 3, while in Figure 4 an angular groove 4 is shown in said edge. In Figure 5 the inner edge of the washer is concaved as shown at 5. In Figure 6 spaced vertical lubricant containing grooves 6 are shown, while in Figure 7, depressions or cups 7 are formed in suitable locations in the inner edge of the washer.

Thus it will be noted that the invention is not limited to any special lubricant containing formations, the gist of this invention residing in the broad idea of providing a lock washer with lubricant containing parts that will automatically function to lubricate the threads of the bolt, and right in this connection I desire to state that, since, after the suggestions and manifest deduction afforded by my invention, it is quite within the range of mechanical skill to construct a washer especially adapted for the automatic lubrication of the bolt threads, I do not wish to be limited to any special formation or adaptation of a lock washer for the purpose of automatically lubricating parts that are associated with such washer in what are commonly known as track joints.

In the construction shown Figures 1, 2 and 3 are preferred, since it is quite clear that less internal stress will be set up within the section itself if the inner edge of the washer is grooved in the center of its thickness.

The improvement hereinbefore described, is an advantage so far as the actual construction of the washer is concerned, since in the tempering process, it is undoubtedly true that the outer walls become heated first, and the heat then progresses to the center of the mass, and if a groove, such as is shown in Figures 1, 2 and 3, is introduced in the mass, the heat will be enabled to reach the center of the mass with more rapidity than would be the case were there solid metal where the grooves exists. In other words, there would be less delay in the penetration of the entire mass by the heat. It is believed that this is the first time that such a form of lock washer has been proposed in a track nut construction to bring about the desired result.

Also, it is desired that the cooling of the washers after they have been heated be effected as uniformly and promptly as possible, and therefore, in the present structure, the cooling medium will act more uniformly and will result in a better job of hardening and a more uniformly hardened structure.

What is claimed is:—

1. In a lubricating device the combination with a splice bar, track bolt and nut, of a spring washer around said bolt and interposed between said bar and nut and having in its inner edge a lubricant container.

2. A construction as in claim 1 further distinguished in that said container consists of a groove formed lengthwise of said edge.

3. A construction as in claim 1 with the addition that said container extends substantially throughout the length of said edge and is in the central portion of the thickness of said edge.

4. In a lubricating device the combination with a threaded bolt, a nut driven on said bolt and an object to be clamped by the action of said nut, of a spring washer surrounding said bolt and confined between said object and nut, and a lubricant carried by the inner edge of said washer and freely exposed adjacent said bolt.

5. In a lubricating device for a structure for railroad track joints comprising parts to be clamped, a threaded bolt extending through the railroad rail and said parts, and a nut driven on said bolt, a spring washer surrounding said bolt beneath said nut and carrying lubricant containing parts that are freely exposed to said bolts, whereby the expansion and contraction of said washer will lubricate the threads of the bolts.

In testimony whereof I affix my signature hereto.

CYRUS H. LOUTREL.